(12) United States Patent
Ishii

(10) Patent No.: US 12,718,354 B2
(45) Date of Patent: Aug. 25, 2026

(54) IMAGE PROCESSING APPARATUS, IMAGE PROCESSING METHOD, AND STORAGE MEDIUM FOR INSPECTING A PRINTED MATERIAL AND TO DISPLAY A RESULT OF THE INSPECTION

(71) Applicant: CANON KABUSHIKI KAISHA, Tokyo (JP)

(72) Inventor: Toshiyuki Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 18/506,427

(22) Filed: Nov. 10, 2023

(65) Prior Publication Data

US 2024/0169516 A1 May 23, 2024

(30) Foreign Application Priority Data

Nov. 15, 2022 (JP) ................................ 2022-182935

(51) Int. Cl.
*G06T 7/00* (2017.01)
*G06T 7/13* (2017.01)

(52) U.S. Cl.
CPC ................ *G06T 7/001* (2013.01); *G06T 7/13* (2017.01); *G06T 2207/30144* (2013.01)

(58) Field of Classification Search
None
See application file for complete search history.

(56) References Cited

U.S. PATENT DOCUMENTS 11,822,840 B2 * 11/2023 Fujita .................... G06F 3/1208
2021/0073966 A1 * 3/2021 Teshima .................. G06T 7/001
2022/0083294 A1 * 3/2022 Agehama .............. G06F 3/1252
2023/0074128 A1 * 3/2023 Fujita .................... G06F 3/1285
2023/0297297 A1 * 9/2023 Ishikawa ............ H04N 1/00074 358/1.15
2024/0169516 A1 * 5/2024 Ishii .................... B41F 33/0036

FOREIGN PATENT DOCUMENTS

JP 2021041628 A 3/2021

* cited by examiner

*Primary Examiner* — Tahmina N Ansari
(74) *Attorney, Agent, or Firm* — Canon U.S.A., Inc. IP Division

(57) ABSTRACT

An image processing apparatus includes a first inspecting unit configured to inspect a target image by using an original image as a first reference image, the target image being obtained by reading a material printed based on the original image, a second inspecting unit configured to inspect the target image by using, as a second reference image, a read image acquired based on reading at least one material printed based on the original image, and a display control unit configured to cause display of a result of the inspection by the first inspecting unit and a result of the inspection by the second inspecting unit in such a way that the result of the inspection by the first inspecting unit and the result of the inspection by the second inspecting unit are identifiable.

11 Claims, 7 Drawing Sheets

PRINTING SERVER
180
PRINTING APPARATUS
190
192
191
SHEET FEEDING UNIT
UI PANEL
108
107
IMAGE PROCESSING APPARATUS
100
110
IMAGE READING DEVICE
105
CPU
101
RAM
102
ROM
103
109
PRINTING APPARATUS I/F
106
112
111

FIG. 4

INSPECTION MODE
1101
RIP&SCAN
RIP
SCAN

INSPECTION JOB SETTING
1102
JOB 1
JOB 2

INSPECTION LEVEL SETTING
1103
INSPECTION LEVEL 5 (HIGH)
...
INSPECTION LEVEL 1 (LOW)

OPERATION SETTING FOR CASE WHERE IT IS DETERMINED THAT DEFECT IS PRESENT IN INSPECTION
1104
STOP WHEN IT IS CONSECUTIVELY DETERMINED THAT DEFECT IS PRESENT
RECOVERY

INSPECTION EXECUTION
1105

DISPLAY WINDOW
1106

1107
INSPECTION TARGET IMAGE

1108
RIP DETERMINATION RESULT

1109
SCAN DETERMINATION RESULT

1110
No1
No2
No3
No4
No5
COMPREHENSIVE DETERMINATION RESULT

1111

| No | DETERMINATION IN RIP INSPECTION | DETERMINATION IN SCAN INSPECTION | COMPREHENSIVE DETERMINATION |
|---|---|---|---|
| 1 | NOT ACCEPTABLE (LINE) | NOT ACCEPTABLE (LINE) | NOT ACCEPTABLE (LINE) |
| 2 | ACCEPTABLE | NOT ACCEPTABLE (SPOT) | ACCEPTABLE |
| 3 | NOT ACCEPTABLE (SPOT) | NOT ACCEPTABLE (SPOT) | NOT ACCEPTABLE (SPOT) |
| 4 | NOT ACCEPTABLE (LINE) | ACCEPTABLE | ACCEPTABLE |
| 5 | NOT ACCEPTABLE (LINE) | ACCEPTABLE | ACCEPTABLE |

FIG. 6

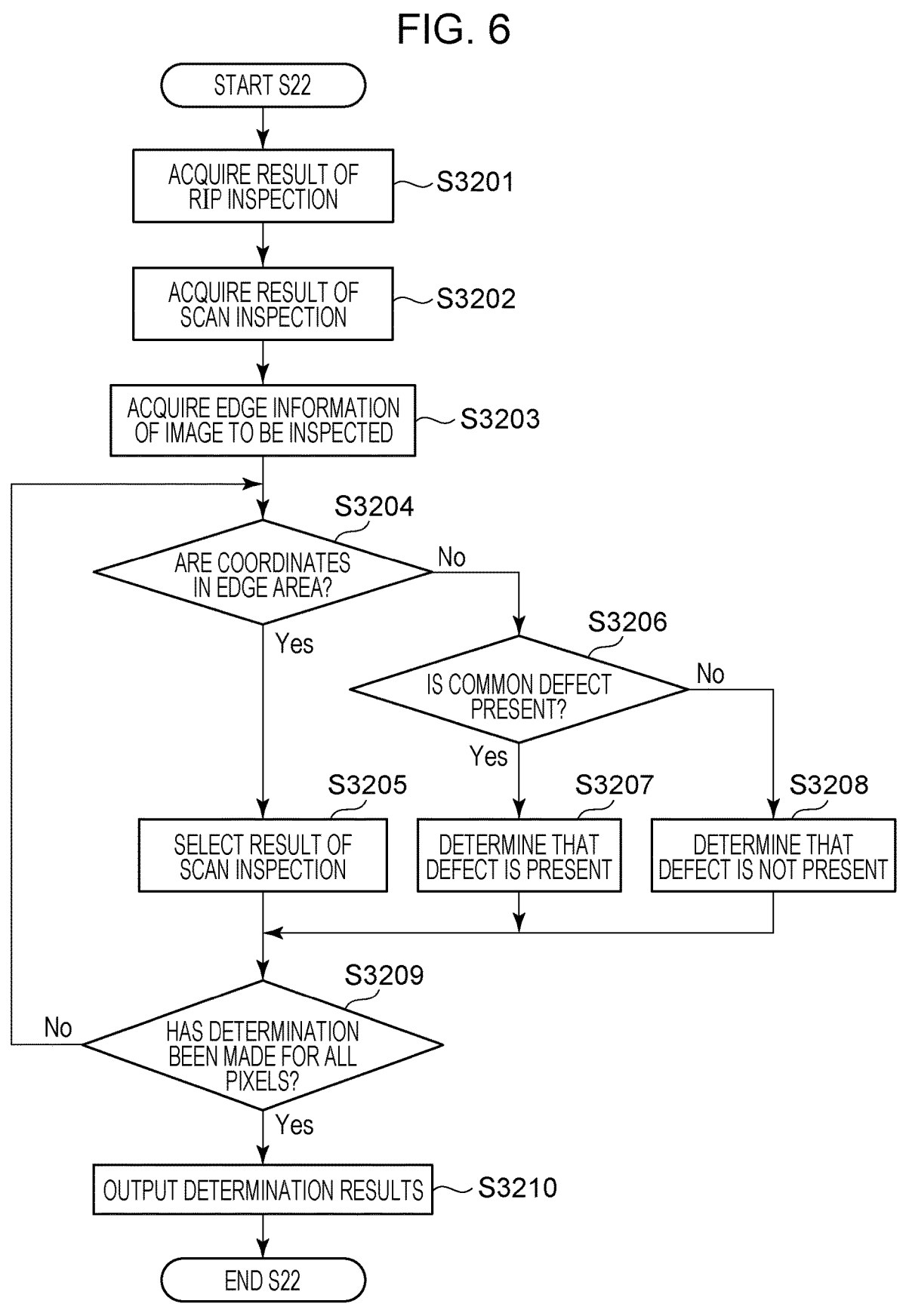

START S22

ACQUIRE RESULT OF RIP INSPECTION — S3201

ACQUIRE RESULT OF SCAN INSPECTION — S3202

ACQUIRE EDGE INFORMATION OF IMAGE TO BE INSPECTED — S3203

S3204: ARE COORDINATES IN EDGE AREA? (Yes → S3205; No → S3206)

S3206: IS COMMON DEFECT PRESENT? (Yes → S3207; No → S3208)

S3205: SELECT RESULT OF SCAN INSPECTION

S3207: DETERMINE THAT DEFECT IS PRESENT

S3208: DETERMINE THAT DEFECT IS NOT PRESENT

S3209: HAS DETERMINATION BEEN MADE FOR ALL PIXELS? (Yes → S3210; No → S3204)

OUTPUT DETERMINATION RESULTS — S3210

END S22

IMAGE PROCESSING APPARATUS, IMAGE PROCESSING METHOD, AND STORAGE MEDIUM FOR INSPECTING A PRINTED MATERIAL AND TO DISPLAY A RESULT OF THE INSPECTION

BACKGROUND

Field of the Disclosure

The present disclosure relates to an image processing technique for inspecting a printed material.

Description of the Related Art

A printed material output by a printing apparatus may have a stain caused by a coloring material, such as ink or toner, adhering to an unintended location on the printed material, or color loss caused by a coloring material not sufficiently adhering to a portion where an image is to be formed on the printed material. As a system for inspecting whether such print defects are present, a printing inspection system is present, which uses a camera, a line sensor of a scanner, or the like to read a printed material output by a printing apparatus and automatically inspects, based on a read image of the printed material, whether printing is normally performed.

Such a printing inspection system can determine whether a defect is present on a printed material to be inspected, based on a difference between a reference image that is an image of a printed material without a defect and a read image of the printed material to be inspected.

As inspection of a printed material, inspection (hereinafter referred to as RIP inspection) using an original image as a reference image and inspection (hereinafter referred to as scan inspection) using a read image as a reference image are known. RIP is an abbreviation for Raster Image Processor. Japanese Patent Laid-Open No. 2021-41628 discloses a technique for performing inspection using a read image as a reference image in a case where an inspection level is high and for performing inspection using an original image as a reference image in a case where the inspection level is low.

However, each of the RIP inspection and the scan inspection has a factor that reduces the accuracy of the inspection, and thus the inspection may not be performed with high accuracy in the technique disclosed in Japanese Patent Laid-Open No. 2021-41628.

SUMMARY

Aspects of the present disclosure provide a process for inspecting a printed material with high accuracy.

According to the present disclosure, an image processing apparatus includes a first inspecting unit configured to inspect a target image by using an original image as a first reference image, the target image being obtained by reading a material printed based on the original image, a second inspecting unit configured to inspect the target image by using, as a second reference image, a read image acquired based on reading at least one material printed based on the original image, and a display control unit configured to cause display of a result of the inspection by the first inspecting unit and a result of the inspection by the second inspecting unit in such a way that the result of the inspection by the first inspecting unit and the result of the inspection by the second inspecting unit are identifiable.

Further features of the present disclosure will become apparent from the following description of embodiments (with reference to the attached drawings).

BRIEF DESCRIPTION OF THE DRAWINGS

FIG. 4 is a diagram illustrating an example of a user interface.

FIG. 6 is a flowchart illustrating a process of determining whether a defect is present.

DESCRIPTION OF THE EMBODIMENTS

Hereinafter, embodiments are described with reference to the drawings. The following embodiments do not necessarily limit the present disclosure. In addition, all combinations of features described in the following embodiments are not necessarily essential to implement the present disclosure.

First Embodiment

Each of RIP inspection and scan inspection has an advantage and a disadvantage in terms of accuracy. In the RIP inspection, an unprinted original image does not include a defect, and thus no excessive detection due to a defect included in a reference image occurs. However, the original image and a read image are different in color characteristics, fine line reproducing property, geometric distortion, and the like, and thus excessive detection due to a difference between these image characteristics easily occurs. Meanwhile, in the scan inspection, a reference image and an image to be inspected are both read images, and thus excessive detection due to a difference between image characteristics hardly occurs. However, even in a case where the read image used as the reference image includes a microscopic defect, it may be determined that a defect is present in a region that is included in the image to be inspected and in which a defect is not present. In addition, in a case where the read image includes a large defect such as unevenness of a density, and the image to be inspected also includes a similar large defect, a defect to be originally detected may be overlooked.

An image processing apparatus according to the present embodiment performs both RIP inspection and scan inspection and determines whether a defect is present based on results of both the RIP inspection and the scan inspection. Therefore, the image processing apparatus can reduce the occurrence of excessive detection and inspect a printed material with high accuracy, as compared with conventional methods.

Configuration of Printing Inspection System

Figure 1:
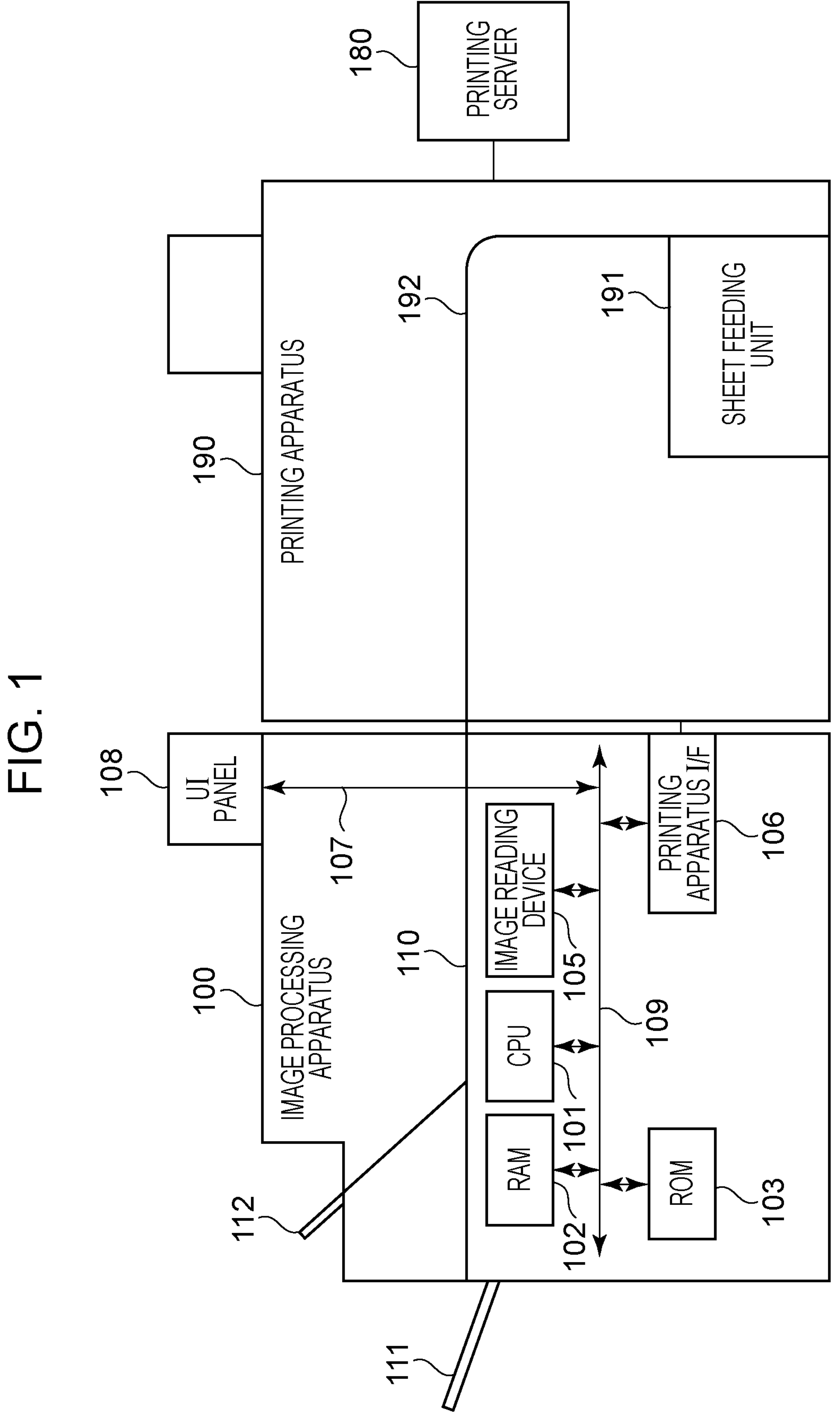
FIG. 1 is a diagram illustrating a configuration of a printing inspection system.

FIG. 1 is a diagram illustrating a configuration of a printing inspection system that outputs and inspects a printed material in the first embodiment. The printing inspection system according to the first embodiment includes the image processing apparatus 100, a printing server 180, and a printing apparatus 190.

The printing server 180 generates a print job including an original to be printed and inputs the print job to the printing apparatus 190. The printing apparatus 190 forms an image on a print medium based on the print job input from the printing server 180. The printing apparatus 190 includes a sheet feeding unit 191. A user can supply the print medium to the sheet feeding unit 191 in advance. When the print job is input to the printing apparatus 190, the printing apparatus 190 forms the image on one or both surfaces of the print medium while conveying, along a conveyance path 192, the print medium supplied to the sheet feeding unit 191, and sends the print medium to the image processing apparatus 100.

The image processing apparatus 100 performs defect inspection on the print medium (medium to be inspected) subjected to the printing. The medium to be inspected is obtained by forming the image on the print medium by the printing apparatus 190 and is conveyed through the conveyance path 192 in the printing apparatus 190. The image processing apparatus 100 includes a CPU 101, a RAM 102, and a ROM 103. The image processing apparatus 100 further includes an image reading device 105, a printing apparatus interface (I/F) 106, a general-purpose interface (I/F) 107, a user interface (UI) panel 108, and a main bus 109. The image processing apparatus 100 further includes a conveyance path 110 for print media. The conveyance path 110 is connected to the conveyance path 192 of the printing apparatus 190. The image processing apparatus 100 further includes an output tray 111 from which a medium to be inspected and determined to be acceptable is output, and an output tray 112 from which a medium to be inspected and determined to be unacceptable is output. In the example illustrated in FIG. 1, the output tray 111 and the output tray 112 are connected to the CPU 101 via the main bus 109. A destination to which a medium to be inspected is conveyed is set to the output tray 111 or the output tray 112 according to a result of inspecting the medium to be inspected.

The image processing apparatus 100 can be implemented by a computer having a processor and a memory. For example, the processor such as the CPU 101 can implement functions of units in the image processing apparatus 100 by executing a program stored in the memory such as the RAM 102 or the ROM 103. The processor such as the CPU 101 can control each of modules in the image processing apparatus 100 as necessary. The image processing apparatus 100 may include a plurality of processing apparatuses connected to each other via a network, for example. The CPU 101 is a processor that controls each of the units in the image processing apparatus 100. The RAM 102 temporarily holds an application to be executed by the CPU 101, data to be used for image processing, and the like. The ROM 103 stores a program group to be executed by the CPU 101.

The image reading device 105 reads one or both surfaces of the print medium conveyed from the printing apparatus 190 and present on the conveyance path 110 and acquires a result of the reading as image data. The conveyance path 110 serves as a background when the image reading device 105 reads an image of the print medium. Therefore, the conveyance path 110 may have a color (for example, black) that is easily distinguished from the print medium on the image.

The printing apparatus OF 106 is connected to the printing apparatus 190. The image processing apparatus 100 can communicate with the printing apparatus 190 via the printing apparatus I/F 106. For example, the printing apparatus 190 and the image processing apparatus 100 can be synchronized with each other via the printing apparatus OF 106 and notify each other of operating statuses of the printing apparatus 190 and the image processing apparatus 100. The UI panel 108 can notify the user of information. The UI panel 108 may be a display device such as a liquid crystal display and can function as a user interface of the image processing apparatus 100. For example, the UI panel 108 can notify the user of a current status of the image processing apparatus 100 or a current setting of the image processing apparatus 100. In addition, the UI panel 108 may include an input device such as a touch panel or a button. The image processing apparatus 100 can accept an instruction from the user via the input device. The main bus 109 is a communication path via which the modules in the image processing apparatus 100 are connected to each other.

The image processing apparatus 100 performs inspection processing of checking whether a defect is present on the print medium based on the image data of the print medium acquired by the image reading device 105 while the conveyance path 110 conveys the print medium output from the printing apparatus 190. In a case where the print medium is determined to be acceptable as a result of the inspection processing, the print medium is conveyed to the output tray 111. In a case where the print medium is determined to be unacceptable as a result of the inspection processing, the print medium is conveyed to the output tray 112. By this operation, only a print medium determined not to have a defect is output to the output tray 111.

The printing inspection system according to the present embodiment includes the printing server 180, but may not include the printing server 180. For example, the printing apparatus 190 may generate the print job or receive the print job from another apparatus connected to the printing apparatus 190. In addition, in the present embodiment, the image processing apparatus 100 includes the image reading device 105, the conveyance path 110, the output tray 111, and the like, but may not include all the image reading device 105, the conveyance path 110, the output tray 111, and the like. For example, the image processing apparatus 100 may include only the CPU 101, the RAM 102, and the ROM 103, and the image reading device 105, the user interface (UI) panel 108, and the like may be devices separated from the image processing device 100.

Functional Configuration of Image Processing Device 100

Figure 2:
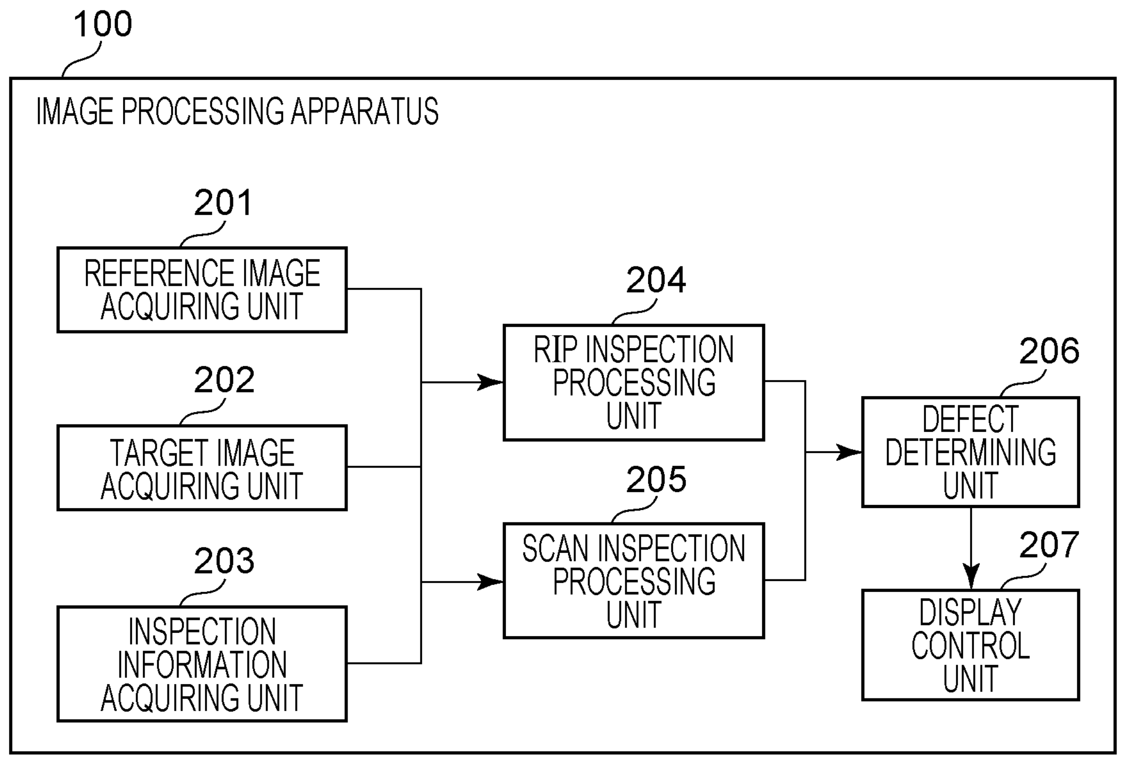
FIG. 2 is a block diagram illustrating a functional configuration of an image processing apparatus.

FIG. 2 is a block diagram illustrating a functional configuration of the image processing apparatus 100 according to the present embodiment.

The CPU 101 functions as the functional configuration illustrated in FIG. 2 by reading and executing a program stored in the ROM 103 or the like while using the RAM 102 as a work memory. Not all processing described below may be executed by the CPU 101. The image processing apparatus 100 may be configured in such a way that a part or all of the processing described below is executed by one or a plurality of processing circuits other than the CPU 101. The image processing apparatus 100 includes a reference image acquiring unit 201, a target image acquiring unit 202, an inspection information acquiring unit 203, an RIP inspection processing unit 204, a scan inspection processing unit 205, a defect determining unit 206, and a display control unit 207.

The reference image acquiring unit 201 acquires, as reference image data for RIP inspection, original image data representing an original image as a printing target, and acquires, as reference image data for scan inspection, read image data acquired based on reading at least one reference material printed based on the original image. The reference image acquiring unit 201 stores the acquired reference image data to the RAM 102 or the ROM 103. The reference image acquiring unit 201 acquires read image data generated by the image reading device 105 reading the medium present on the conveyance path 110 and to be inspected, but may acquire read image data generated using another device. For example, read image data generated by a device different from the image reading device 105 may be stored in a storage device such as an HDD, and the reference image acquiring unit 201 may acquire the read image data from the storage device.

In a case where the read image data is used as the reference image data for scan inspection, a signal-to-noise (S/N) ratio may be improved by synthesizing a plurality of images in order to easily detect a defect in an image to be inspected. For example, the printing apparatus 190 outputs a plurality of images of the same pattern, and the image reading device 105 generates a plurality of read images by reading an output material. The reference image acquiring unit 201 sums and averages pixel values of the plurality of read images by using Equation (1).

$$I_0(x, y) = \frac{1}{N}\sum_{i=1}^{n} I_1(x, y) \tag{1}$$

In Equation (1), (x, y) represents coordinates of each pixel. $I_i(x, y)$ represents pixel values of a plurality of read images at a position (x, y), and $I_o(x, y)$ represents pixel values of an image after synthesis of the plurality of read images at the position (x, y). N represents the number of read images to be synthesized.

The target image acquiring unit 202 acquires inspection target image data representing a read image of the medium subjected to the printing by the printing apparatus 190 and to be inspected. The target image acquiring unit 202 stores the acquired inspection target image data to the RAM 102 or the ROM 103. In the present embodiment, the target image acquiring unit 202 acquires read image data generated by the image reading device 105 reading the medium present on the conveyance path 110 and to be inspected. The inspection information acquiring unit 203 acquires, based on a user instruction acquired via the UI panel 108, information of an inspection job regarding an inspection setting and information regarding an inspection level. The inspection information acquiring unit 203 may acquire, from the storage device such as an HDD, inspection information representing a predetermined inspection setting and an inspection level.

The RIP inspection processing unit (first inspection unit) 204 compares the original image as a reference image (first reference image) with the image to be inspected (target image) so as to determine whether a defect is present in the image to be inspected. The scan inspection processing unit (second inspection unit) 205 compares the read image as a reference image (second reference image) with the image to be inspected so as to determine whether a defect is present in the image to be inspected. The defect determining unit 206 determines, based on a result of the RIP inspection and a result of the scan inspection, whether a defect is present in the image to be inspected. The display control unit 207 causes, on the UI panel 108, display of a UI for notifying the user of information and for prompting the user to enter information necessary for processing.

Process Executed by Image Processing Apparatus 100

Figure 3:
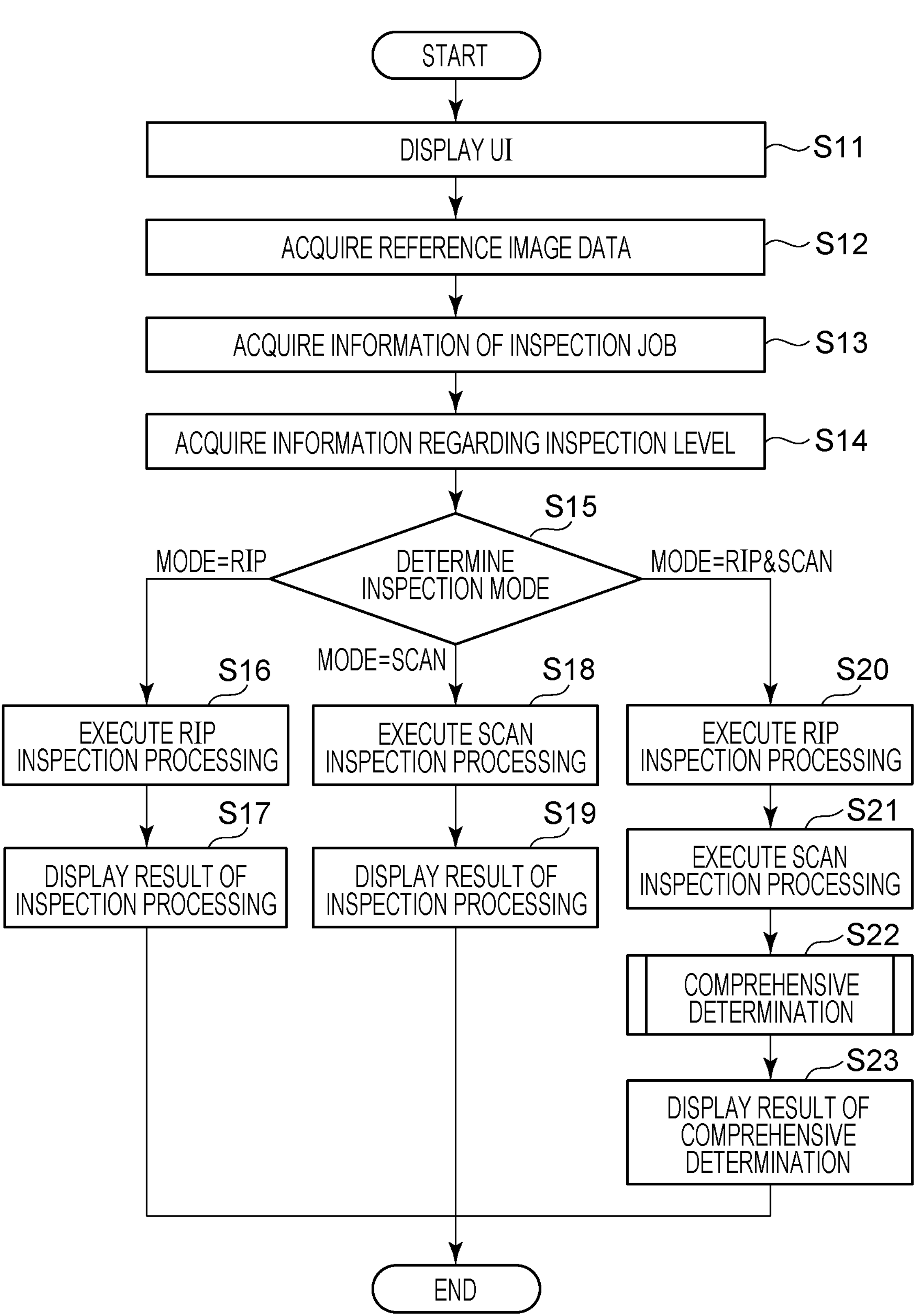
FIG. 3 is a flowchart illustrating a process executed by the image processing apparatus.

In the present embodiment, a procedure of a process executed by the image processing apparatus 100 is described with reference to a flowchart in FIG. 3. The process indicated by the flowchart in FIG. 3 is started when an instruction is entered by the user via the UI panel 108 or the like and the CPU 101 accepts the entered instruction. In the following description, each step (processing) is represented by prefixing a sign with an S.

In S11, the display control unit 207 causes, on the UI panel 108, display of an UI for prompting the user to enter information necessary for inspection. FIG. 4 illustrates an example of the UI displayed in S11. In FIG. 4, an inspection mode setting area 1101 is an area for setting an inspection mode. The user can designate a reference image to be used for inspection by pressing the inspection mode setting area 1101. "RIP" indicates an inspection mode based on the original image data, "SCAN" indicates an inspection mode based on the read image data, and "RIP & SCAN" indicates an inspection mode based on the original image data and the read image data. When an inspection mode is selected, a screen transitions to an image designation screen, and an image designated by the user is held as a reference image in the RAM 102 or the ROM 103. An inspection job setting area 1102 is an area for setting information of an inspection job in which a print job is associated with inspection target image data and information regarding an inspection setting. The user can designate an inspection job registered in advance by pressing the inspection job setting area 1102. The inspection job designated by the user is held in the RAM 102 or the ROM 103.

An inspection level setting area 1103 is an area for setting an inspection level to be used for inspection. The user can select an inspection level from a pulldown menu. A value representing the selected inspection level is held in the RAM 102 or the ROM 103. Each of inspection levels is associated with a processing parameter necessary to detect a defect according to the size and contrast of the defect to be detected. In inspection processing, a defect is detected according to the inspection level selected by the user. In the present embodiment, five inspection levels are provided. As the inspection level is set to be higher, a defect whose contrast is lower and whose size is smaller is detected. As the inspection level is set to be lower, a defect whose contrast is higher and whose size is larger is detected. The number of inspection levels is arbitrary. The association of the inspection levels with characteristics of defects to be detected is not limited to the above-described example.

An operation setting area 1104 for a case where it is determined that a defect is present in inspection is an area for setting an operation for a case where it is determined that a printed material has a defect in inspection. "Stop when it is consecutively determined that a defect is present" is a setting for stopping printing when it is consecutively determined a predetermined number of times that a defect is present. "Recovery" is a setting for stopping a print job and executing re-printing from a page on which a defect is determined to be present when a printed material has the defect and it is determined that the defect is present. An inspection execution area 1105 is an area for executing inspection processing. When the inspection execution area 1105 is pressed, inspection processing is executed based on information set in the setting areas 1101 to 1104. A display window 1106 is an area for displaying an image to be inspected, a defect map, and a determination result. An inspection target image display window 1107 is an area for displaying an image to be inspected. An RIP determination result display window 1108 is an area for displaying a result of a determination performed in the RIP inspection processing. A scan determination result display window 1109 is an area for displaying a result of a determination performed in the scan inspection processing. A comprehensive determination result display window 1110 is an area for displaying a comprehensive determination result obtained by integrating the determination result obtained in the RIP inspection processing with the determination result obtained in the scan inspection processing. A list display area 1111 is an area for displaying a list of defects detected in the determination result obtained in the RIP inspection processing, the determination result obtained in the scan inspection processing, and the comprehensive determination result.

In S12, the reference image acquiring unit 201 acquires, as reference image data for RIP inspection, the original image data representing the original image to be printed, and acquires, as reference image data for scan inspection, the read image data acquired based on reading the at least one reference material printed based on the original image. In S13, the inspection information acquiring unit 203 acquires an inspection job. Specifically, the inspection information acquiring unit 203 acquires information of the inspection job set in the inspection job setting area 1102. In addition, the target image acquiring unit 202 acquires the inspection target image data. In S14, the inspection information acquiring unit 203 acquires an inspection level. Specifically, the inspection information acquiring unit 203 references information set in the inspection level setting area 1103 and acquires a processing parameter associated with the inspection level and relating to the contrast and size of a defect. The order in which the processing in S12 to S14 is performed is not limited to the above-described example. For example, the processing in S14, the processing in S13, and the processing in S12 may be performed in this order, or two or more of the processing in S14, the processing in S13, and the processing in S12 may be performed in parallel.

In S15, the inspection information acquiring unit 203 references an inspection mode set in the inspection mode setting area 1101 and advances the process. Specifically, in a case where the inspection mode is "RIP", the inspection information acquiring unit 203 advances the process to S16. In a case where the inspection mode is "SCAN", the inspection information acquiring unit 203 advances the process to S18. In a case where the inspection mode is "RIP & SCAN", the inspection information acquiring unit 203 advances the process to S20. In S16, the RIP inspection processing unit 204 uses the original image data as the reference image data to execute the RIP inspection on the image represented by the inspection target image data and to be inspected. The RIP inspection processing unit 204 according to the present embodiment performs correction processing on the original image for a color reproducing property and a fine line reproducing property in order to suppress excessive detection of a defect. In the correction processing for the color reproducing property, the RIP inspection processing unit 204 performs correction on the original image by referencing a lookup table (LUT) describing characteristics of the printing apparatus 190, the print medium, and correspondence between CMYK values and RGB values for each output condition. The LUT is created in advance and stored in the storage device such as an HDD. In the correction processing for the fine line reproducing property, the RIP inspection processing unit 204 performs correction on the original image using a filter having a predetermined filter coefficient. A fine line chart is output and read, a filter coefficient for matching a line width and a read image, and a filter coefficient for correcting a defocused state of an edge during reading are calculated in advance based on a line profile of a fine line.

The RIP inspection processing unit 204 generates a reference image (first reference image) for RIP inspection by performing the above-described two types of correction processing on the original image. In addition, the RIP inspection processing unit 204 performs processing of changing the resolution of the original image based on the image size and the resolution of the image to be inspected and used for inspection. The RIP inspection processing unit 204 aligns the reference image (first reference image) with the image to be inspected, calculates differences between pixel values of the two images, and determines, as a defect pixel, a pixel of which the calculated difference from a pixel of the reference image is larger than a predetermined threshold. The RIP inspection processing unit 204 according to the present embodiment references a contrast threshold for a difference between pixels, a size of a spot defect, and a size of a line defect, which are held for each inspection level, and determines whether a spot defect and a line defect are present.

In S17, the display control unit 207 causes display of a defect map as a result of the inspection processing in S16 on the display window 1106. The defect map represents a coordinate position of a defect detected by the inspection. The defect map is an image file having the same vertical and horizontal sizes as those of the reference image (first reference image) and the image to be inspected. In the defect map, for example, pixel values of (R, G, B)=(255, 255, 255) are stored at a coordinate position where a defect is present, and pixel values of (R, G, B)=(0, 0, 0) are stored at a coordinate position where a defect is not present. In the present embodiment, in a case where a spot defect is present, pixel values of (R, G, B)=(255, 0, 0) are stored at a coordinate position where the spot defect is present. In the present embodiment, in a case where a line defect is present, pixel values of (R, G, B)=(0, 255, 0) are stored at a coordinate position where the line defect is present. Pixel values in the defect map are not limited to the above-described example as long as the pixel values identify whether a defect is present, and identify a type of a defect (e.g., a spot, a line, etc.) in a case where the defect is present.

In S18, the scan inspection processing unit 205 uses the read image data as reference image data to execute the scan inspection on the image represented by the inspection target image data and to be inspected. The scan inspection processing unit 205 aligns the reference image (second reference image) with the image to be inspected, calculates a difference between pixel values of the two images, and determines, as a defect pixel, a pixel of which the calculated difference from a pixel of the reference image (second reference image) is larger than a predetermined threshold. In S19, the display control unit 207 causes display of a defect map as a result of the inspection processing in S18 on the display window 1106.

In S20, the RIP inspection processing unit 204 executes the RIP inspection in a similar manner to the processing in S16. In S21, the scan inspection processing unit 205 executes the scan inspection in a similar manner to the processing in S18. In S22, the defect determining unit 206 determines, based on both a result of the determination in S20 and a result of the determination in S21, whether a defect is present in the image to be inspected. The processing by the defect determining unit 206 is described below in detail.

In S23, the display control unit 207 causes, on the display window 1106, display of a defect map and an inspection report as a result of the comprehensive determination in S22. The display control unit 207 causes, on the RIP determination result display window 1108, display of a defect map that is the result of the determination in S20. The display control unit 207 causes, on the scan determination result display window 1109, display of a defect map that is the result of the determination in S21. The display control unit 207 causes, on the comprehensive determination result display window 1110, display of the defect map that is the result of the comprehensive determination in S22. Defects displayed on the comprehensive determination result display window 1110 are defects obtained by integrating a location determined as a defect by the defect determining unit 206, a location determined as a defect in the RIP inspection, and a location determined as a defect in the scan inspection, and are displayed in different colors.

For example, in a case where four defects (No. 1, No. 3, No. 4, and No. 5) are detected in the RIP inspection, three defects (No. 1, No. 2, and No. 3) are detected in the scan inspection, and two defects (No. 1, and No. 3) are detected in the comprehensive determination, the display control unit 207 performs color coding on the defects based on the inspection results. The display control unit 207 according to the present embodiment uses pixel values of (R, G, B)=(255, 255, 0) to cause display of the defects (No. 1 and No. 3) detected in the comprehensive determination. In addition, the display control unit 207 uses pixel values of (R, G, B)=(255, 0, 0) to cause display of the defects (No. 4 and No. 5) detected in only the RIP inspection, and uses pixel values of (R, G, B)=(0, 0, 255) to cause display of the defect (No. 2) detected in only the scan inspection. The display control unit 207 uses pixel values of (R, G, B)=(0, 0, 0) to cause display of coordinates where a defect is not detected. The display control unit 207 causes display of a list of the determination results as the inspection report in the list display area 1111.

In the present embodiment, all of the result of the RIP inspection, the result of the scan inspection, and the result of the comprehensive determination are displayed, but only the result of the comprehensive determination may be displayed. In addition, the user may select an inspection result to be displayed.

Process Executed by Defect Determining Unit 206

Figure 5:
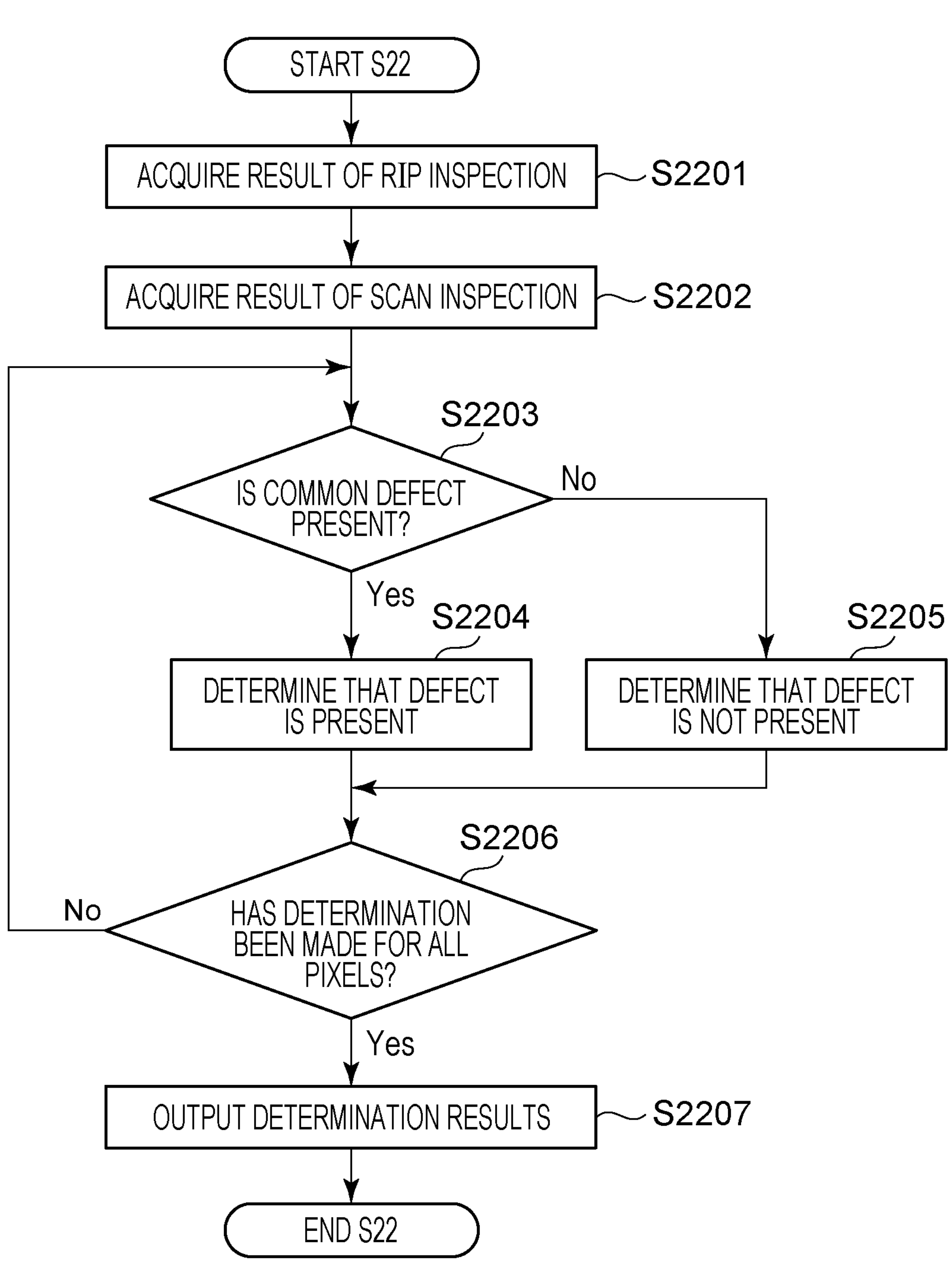
FIG. 5 is a flowchart illustrating a process of determining whether a defect is present.

FIG. 5 is a flowchart illustrating a procedure of a process executed by the defect determining unit 206 in S22. In S2201, the defect determining unit 206 acquires the defect map that is the result of the RIP inspection executed in S20. The defect map is generated by the RIP inspection processing unit 204. In S2202, the defect determining unit 206 acquires the defect map that is the result of the scan inspection executed in S21. The defect map is generated by the scan inspection processing unit 205. In S2203, the defect determining unit 206 compares each pixel of the defect map acquired in S2201 with each pixel of the defect map acquired in S2202 and determines whether a defect is present at the same coordinate position in the defect maps. In a case where the defect is present at the same coordinate position, the defect determining unit 206 advances the process to S2204. In a case where the defect is not present at the same coordinate position, the defect determining unit 206 advances the process to S2205. The defect determining unit 206 according to the present embodiment determines whether a defect is present at the same coordinate position in the defect maps. However, the defect determining unit 206 may determine whether types of defects (e.g., a spot, a line, etc.) in the defect maps match, in addition to the determination as to whether a defect is present at the same coordinate position in the defect maps.

In S2204, in a case where the defect is present at the same coordinate position, the defect determining unit 206 determines that the defect is present, and stores pixel values of (R, G, B)=(255, 255, 0) at coordinates corresponding to the coordinate position in the defect map that is the result of the comprehensive determination in S22. In S2205, in a case where the defect is not present at the same coordinate position, the defect determining unit 206 determines that the defect is not present, and stores pixel values of (R, G, B)=(0, 0, 0) at coordinates corresponding to the coordinate position in the defect map that is the result of the comprehensive determination in S22. In S2206, the defect determining unit 206 determines whether the defect determining unit 206 has determined whether a defect is present at all pixel positions in the defect maps. In a case where the defect determining unit 206 has determined whether a defect is present at all the pixel positions, the defect determining unit 206 advances the process to S2207. In a case where the defect determining unit 206 has not determined whether a defect is present at all the pixel positions, the defect determining unit 206 returns the process to S2203. The defect determining unit 206 outputs the defect map to the storage device in S2207 and ends the processing in S22. An output destination of the final defect map is not limited to the storage device. The defect determining unit 206 may output the defect map directly to the display control unit 207 or may output the defect map to another device.

The image processing apparatus 100 according to the present embodiment executes both the RIP inspection and the scan inspection, and can use the results of the RIP inspection and the scan inspection to improve the accuracy of the inspection and execute the defect determination with less excessive detection of a defect.

Second Embodiment

In the first embodiment, both the RIP inspection and the scan inspection are executed, and in a case where a defect is present at the same coordinate position in the defect maps, it is determined that the defect is present at the corresponding coordinate position. In the present embodiment, an edge area is extracted from an image to be inspected, inspection processing is executed on the edge area using a read image as a reference image (second reference image), and inspection processing is executed on a non-edge area using an original image and the read image as reference images (first and second reference images). The non-edge area is included in the image to be inspected. In RIP inspection using the original image as a reference image (first reference image), excessive detection may easily occur in the edge area due to a difference in fine line reproducing property. Therefore, an area on which the comprehensive determination that is performed in the first embodiment is performed is determined for each of the edge area and the non-edge area. By performing this determination, it is possible to suppress excessive detection of a defect. A hardware configuration and a functional configuration of an image processing apparatus according to the present embodiment are the same as or similar to those in the first embodiment, and will not be described in the present embodiment. Differences between the present embodiment and the first embodiment will be mainly described below. The same configurations as those described in the first embodiment are denoted by the same reference signs and described below.

Process Executed by Defect Determining Unit 206

FIG. 6 is a flowchart illustrating a procedure of a process executed by a defect determining unit 206 in S22. In S3201, the defect determining unit 206 acquires a defect map that is a result of RIP inspection executed in S20. In S3202, the defect determining unit 206 acquires a defect map that is a result of scan inspection executed in S21. In S3203, the defect determining unit 206 acquires edge information of the image to be inspected. Specifically, the defect determining unit 206 generates the edge information by detecting, from the image to be inspected, the edge area by applying a known edge detection filter such as a Sobel filter or a Laplacian filter to the image to be inspected, and binarizing pixel values after applying the filter. The defect determining unit 206 may further apply an expansion filter or a reduction filter to the edge area. In S3204, the defect determining unit 206 determines, based on pixel values of the edge area acquired in S3203, whether coordinates on the defect maps acquired in S3201 and S3202 are in the edge area. In a case where the coordinates in the defect maps are in the edge area, the defect determining unit 206 advances the process to S3205. In a case where the coordinates on the defect maps are not in the edge area, the defect determining unit 206 advances the process to S3206.

In S3205, the defect determining unit 206 selects the result of the determination performed on the defect map acquired in S3202 for the coordinates determined to be in the edge area. In S3206, the defect determining unit 206 compares each pixel of the defect map acquired in S3201 with each pixel of the defect map acquired in S3202 and determines whether a defect is present at the same coordinate position in the defect maps. In a case where the defect is present at the same coordinate position, the defect determining unit 206 advances the process to S3207. In a case where the defect is not present at the same coordinate position, the defect determining unit 206 advances the process to S3208. In S3207, in a case where the defect is present at the same coordinate position, the defect determining unit 206 determines that the defect is present, and stores pixel values of (R, G, B)=(255, 255, 0) at coordinates corresponding to the coordinate position in a defect map that is a result of comprehensive determination in S22.

In S3208, in a case where the defect is not present at the same coordinate position, the defect determining unit 206 determines that the defect is not present, and stores pixel values of (R, G, B)=(0, 0, 0) at coordinates corresponding to the coordinate position in the defect maps. In S3209, the defect determining unit 206 determines whether the defect determining unit 206 has determined whether a defect is present at all pixel positions in the defect maps. In a case where the defect determining unit 206 has determined whether a defect is present at all the pixel positions, the defect determining unit 206 advances the process to S3210. In a case where the defect determining unit 206 has not determined whether a defect is present at all the pixel positions, the defect determining unit 206 returns the process to S3204. The defect determining unit 206 outputs the defect map to the storage device in S3210 and ends the processing in S22.

The image processing apparatus 100 according to the present embodiment uses an inspection result of the scan inspection for the edge area on which the RIP inspection may not be appropriately performed. The image processing apparatus 100 according to the present embodiment uses inspection results of both the RIP inspection and the scan inspection for the non-edge area. Therefore, it is possible to obtain appropriate inspection results for an image to be inspected and having many edges.

Third Embodiment

In the present embodiment, based on an inspection level, it is determined whether to use inspection results of both RIP inspection and scan inspection. In a case where the inspection level is high, excessive detection may occur due to a small difference between image characteristics in the RIP inspection, and thus the scan inspection is executed. In a case where the inspection level is middle or lower, both the RIP inspection and the scan inspection are executed. A hardware configuration and a functional configuration of an image processing apparatus according to the present embodiment are the same as or similar to those described in the first embodiment, and will not be described below. Differences between the present embodiment and the first embodiment will be mainly described below. The same configurations as those described in the embodiments described above are denoted by the same reference signs and described below.

Process Executed by Defect Determining Unit 206

Figure 7:
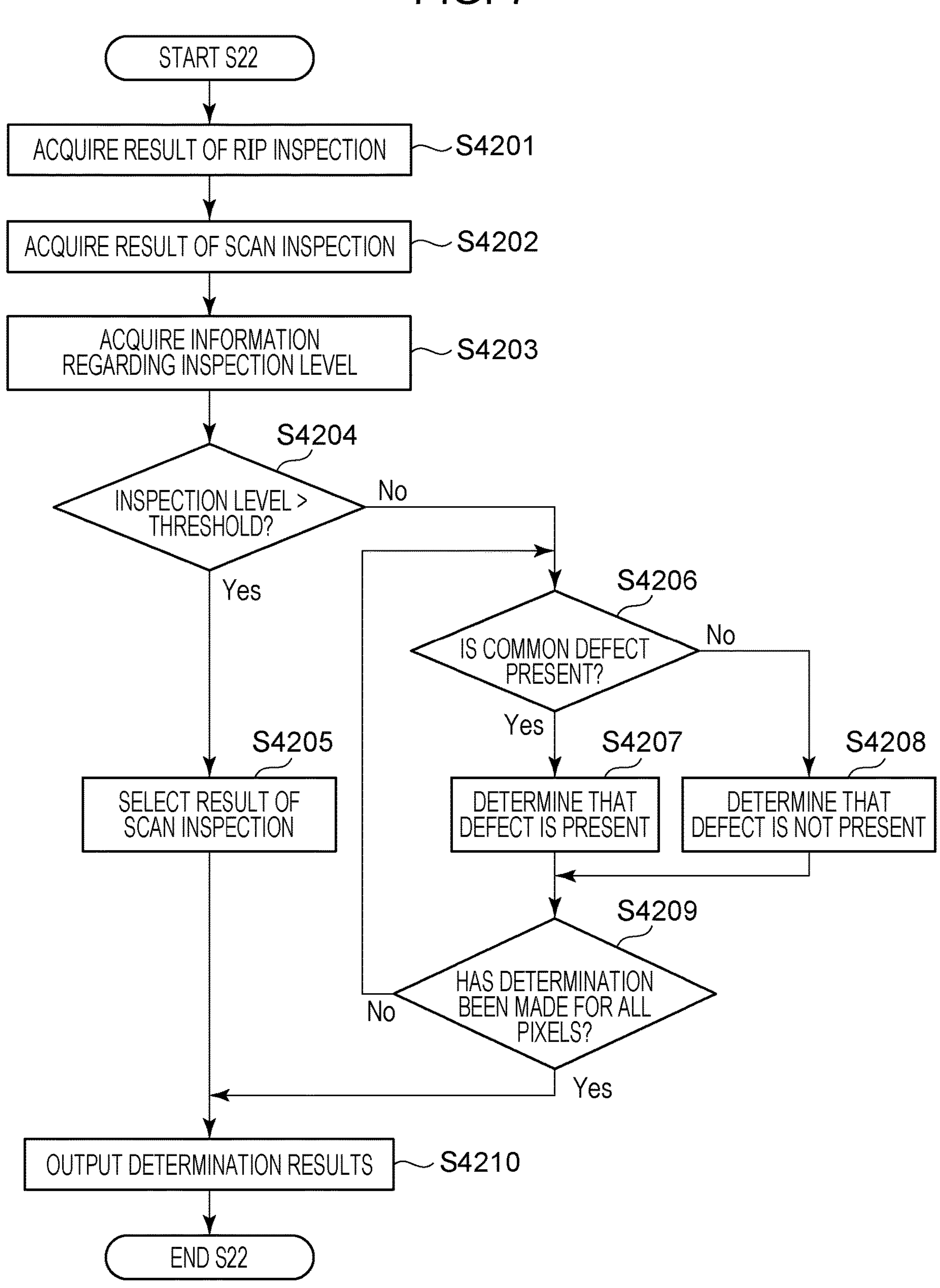
FIG. 7 is a flowchart illustrating a process of determining whether a defect is present.

FIG. 7 is a flowchart illustrating a procedure of a process executed by a defect determining unit 206 in S22. In S4201, the defect determining unit 206 acquires a defect map that is a result of RIP inspection executed in S20. In S4202, the defect determining unit 206 acquires a defect map that is a result of scan inspection executed in S21. In S4203, the defect determining unit 206 acquires an inspection level set in an inspection level setting area 1103. In S4204, the defect determining unit 206 compares the inspection level acquired in S4203 with a predetermined threshold. In a case where the inspection level is higher than the predetermined threshold, the defect determining unit 206 advances the process to S4205. In a case where the inspection level is equal to or lower than the predetermined threshold, the defect determining unit 206 advances the process to S4206. In the present embodiment, five inspection levels are provided and the threshold is 4. In the present embodiment, only in a case where the inspection level is set to 5, which is the highest level, the defect determining unit 206 advances the process to S4205. However, the threshold is not limited to the above-described example.

In S4205, in a case where the inspection level is set to be higher than the threshold, the defect determining unit 206 selects a result of determination performed on the defect map acquired in S4202. In a case where the inspection level is high, the sensitivity to the contrast and size of a defect to be detected is high, and the frequency of occurrence of excessive detection is high when the result of the RIP inspection is selected. Therefore, the result of the determination performed on the defect map only in the scan inspection is selected as a final determination result.

In the S4206, the defect determining unit 206 compares each pixel of the defect map acquired in S4201 with each pixel of the defect map acquired in S4202 and determines whether a defect is present at the same coordinate position in the defect maps. In a case where the defect is present at the same coordinate position, the defect determining unit 206 advances the process to S4207. In a case where the defect is not present at the same coordinate position, the defect determining unit 206 advances the process to S4208. In S4207, in a case where the defect is present at the same coordinate position, the defect determining unit 206 determines that the defect is present, and stores pixel values of (R, G, B)=(255, 255, 0) at coordinates corresponding to the coordinate position in a defect map that is a result of comprehensive determination in S22. In S4208, in a case where the defect is not present at the same coordinate position, the defect determining unit 206 determines that the defect is not present, and stores pixel values of (R, G, B)=(0, 0, 0) at coordinates corresponding to the coordinate position in the defect map that is the result of the comprehensive determination in S22.

In S4209, the defect determining unit 206 determines whether the defect determining unit 206 has determined whether a defect is present at all pixel positions in the defect maps. In a case where the defect determining unit 206 has determined whether a defect is present at all the pixel positions, the defect determining unit 206 advances the process to S4210. In a case where the defect determining unit 206 has not determined whether a defect is present at all the pixel positions, the defect determining unit 206 returns the process to S4206. The defect determining unit 206 outputs the defect map to a storage device in S4210 and ends the processing in S22.

In a case where the inspection level is set to the highest level, the image processing apparatus 100 according to the present embodiment selects only the result of the scan inspection. In a case where the inspection level is set to the other levels, the inspection results of both the RIP inspection and the scan inspection are selected. Therefore, it is possible to execute the inspection with high accuracy regardless of the inspection level.

In the above embodiments, the mode in which a defect is detected by the inspection of a printed material is described above. The embodiments can be applied to a mode in which a pattern, a texture, and the like that are included in a printed material and have a predetermined characteristic are detected.

It is possible to inspect a printed material with high accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-182935 filed Nov. 15, 2022, which is hereby incorporated by reference herein in its entirety.

What is claimed is:

1. An image processing apparatus comprising:

at least one memory and at least one processor, wherein the at least one memory and the at least one processor are configured to implement:

a first inspecting unit configured to inspect a target image by using an original image as a first reference image, the target image being obtained by reading a material printed based on the original image;

a second inspecting unit configured to inspect the target image by using, as a second reference image, a read image acquired based on reading at least one material printed based on the original image;

a determining unit configured to determine whether a defect is present in the target image based on the result of the inspection by the first inspecting unit and the result of the inspection by the second inspecting unit, and outputs a result of the determination as a result of inspecting the target image; and a display control unit configured to cause display on a display device of the determination result of the inspection by the first inspecting unit from the determining unit, the determination result of the inspection by the second inspecting unit from the determining unit, and a comprehensive determination result integrating the determination results of the first and second inspection units, respectively, in such a way that the determination result of the inspection by the first inspecting unit, the determination result of the inspection by the second inspecting unit, and the comprehensive determination result are identifiable on the display device.

2. The image processing apparatus according to claim 1, wherein the determining unit determines whether a defect is present in the target image based on a position of a defect detected by the first inspecting unit and a position of a defect detected by the second inspecting unit.

3. The image processing apparatus according to claim 2, wherein the determining unit determines that the defect is present in the target image in a case where the position of the defect detected by the first inspecting unit matches the position of the defect detected by the second inspecting unit.

4. The image processing apparatus according to claim 3, wherein the determining unit determines that the defect is present in the target image in a case where the position of the defect and a defect type of the defect detected by the first inspecting unit match the position of the defect and the defect type of the defect detected by the second inspecting unit.

5. The image processing apparatus according to claim 1, wherein the determining unit acquires edge information of the target image and determines, based on the edge information, whether a defect is present in the target image.

6. The image processing apparatus according to claim 5, wherein the determining unit determines whether a defect is present in an edge area in the target image by using the result of the inspection by the second inspecting unit, and determines whether a defect is present in a non-edge area in the target image by using both the result of the inspection by the first inspecting unit and the result of the inspection by the second inspecting unit.

7. The image processing apparatus according to claim 1, wherein the determining unit determines whether a defect is present in the target image based on an inspection level for the target image.

8. The image processing apparatus according to claim 7, wherein the determining unit determines whether a defect is present in the target image by using only the result of the inspection by the second inspecting unit in a case where the inspection level is a first level, and wherein the determining unit determines whether a defect is present in the target image by using both the result of the inspection by the first inspecting unit and the result of the inspection by the second inspecting unit in a case where the inspection level is a second level lower than the first level.

9. The image processing apparatus according to claim 1, wherein the display control unit causes display of the result of the inspection by the first inspecting unit and the result of the inspection by the second inspecting unit in different colors.

10. An image processing method comprising:

performing first inspection to inspect a target image by using an original image as a first reference image, the target image being obtained by reading a material printed based on the original image;

performing second inspection to inspect the target image by using, as a second reference image, a read image acquired based on reading at least one material printed based on the original image;

determining whether a defect is present in the target image based on the result of the first inspection and the result of the second inspection;

outputting a result of the determination of the first inspection and the second inspection as a result of inspecting the target image; and displaying on a display device the determination a result of the first inspection, the determination result of the second inspection, and a comprehensive determination result integrating the determination results of the first and second inspections, respectively, in such a way that the determination result of the first inspection, the determination result of the second inspection, and the comprehensive determination result are identifiable on the display device.

11. A non-transitory computer-readable storage medium storing instructions that, when executed by a computer, cause the computer to perform an image processing method, the image processing method comprising:

performing first inspection to inspect a target image by using an original image as a first reference image, the target image being obtained by reading a material printed based on the original image;

performing second inspection to inspect the target image by using, as a second reference image, a read image acquired based on reading at least one material printed based on the original image;

determining whether a defect is present in the target image based on the result of the first inspection and the result of the second inspection;

outputting a result of the determination of the first inspection and the second inspection as a result of inspecting the target image; and displaying on a display device the determination a result of the first inspection, the determination result of the second inspection, and a comprehensive determination result integrating the determination results of the first and second inspections, respectively, in such a way that the determination result of the first inspection, the determination result of the second inspection, and the comprehensive determination result are identifiable on the display device.

* * * * *